J. G. WHITE.
Blind-Slat Adjuster.
No. 165,394.
Patented July 6, 1875.
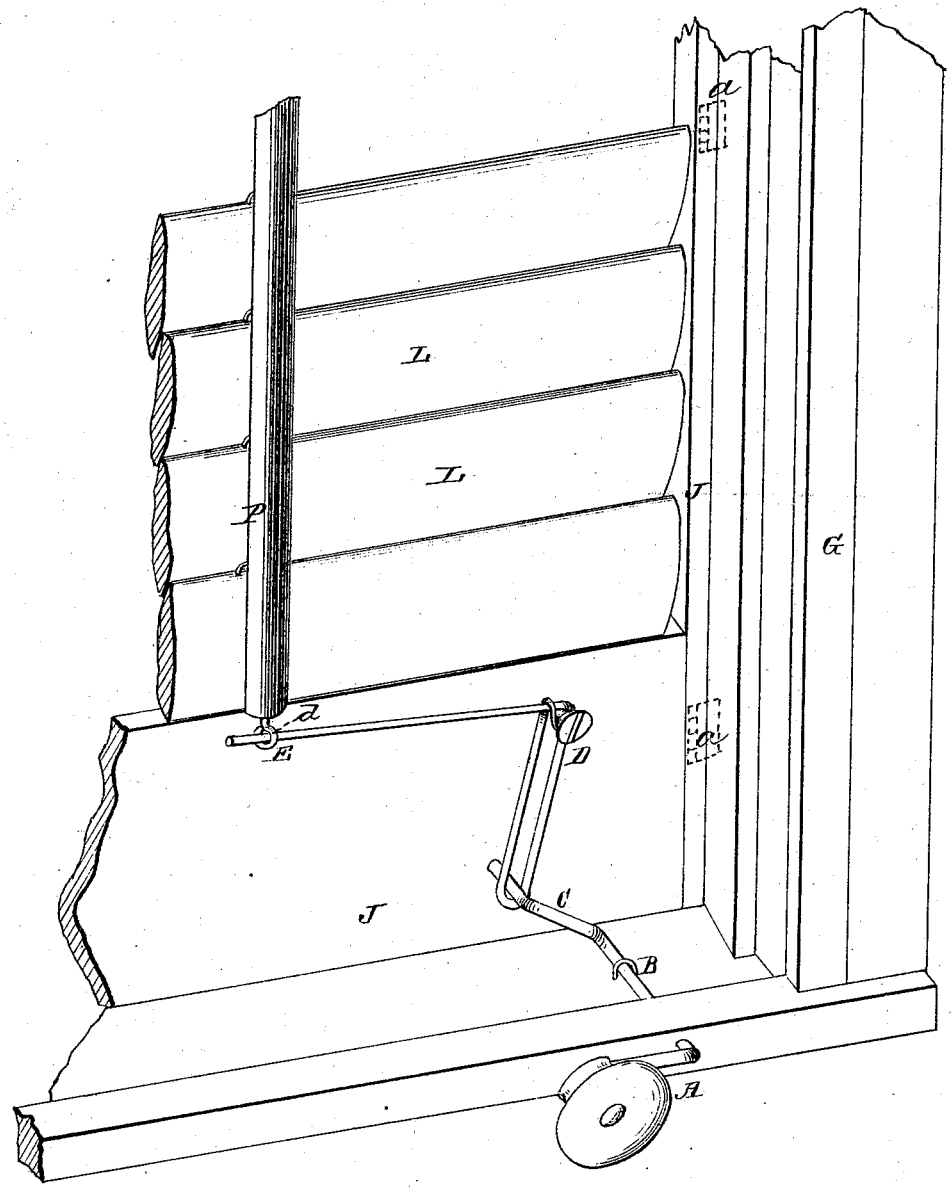

UNITED STATES PATENT OFFICE.

JOHN G. WHITE, OF CHARLOTTE, MICHIGAN.

IMPROVEMENT IN BLIND-SLAT ADJUSTERS.

Specification forming part of Letters Patent No. 165,394, dated July 6, 1875; application filed February 16, 1875.

*To all whom it may concern:*

Be it known that I, JOHN G. WHITE, of Charlotte, in the county of Eaton and State of Michigan, have invented certain new and useful Improvements in Blind-Slat Adjusters; and I do hereby declare the following to be a full, clear, and exact description thereof, reference being had to the accompanying drawing and to the letters of reference marked thereon.

My invention relates to that class of window-blinds in which a series of pivoted slats are connected by a vertical bar for adjusting the slats at any angle desired; and the nature of my invention consists in the novel construction and arrangement of a device for operating the connecting-bar of the blind-slats, as will be hereinafter more fully set forth and definitely claimed.

In order to enable others skilled in the art to which my invention appertains to make and use the same, I will now proceed to describe its construction and operation, referring to the annexed drawing, which forms a part of this specification, and which represents a perspective view of my invention.

G represents a portion of the window-frame to which the blind is hinged on the outer side in the usual manner at *a a*. J is the frame of the blind, with the slats L L pivoted therein, said slats being connected by the upright bar P. B represents a shaft or rod placed in or on the sill of the window-frame G near the side where the blind is hinged, the inner end of said rod being provided with a crank with knob A, and the outer end also provided with a crank, C. On the lower rail of the blind-frame J is pivoted an elbow or bell-crank lever, D E, one arm D of which is slotted to receive the end of the crank C when the blind is closed, and the other arm E of the lever is inserted in an eye-screw, *d*, in the lower end of the slat-bar P. Ordinarily, in this class of window-blinds, the bar P is attached to th slats in the center of either the upper or lower edges; but I locate said bar near the outer ends of the slats—that is, near the free end of the window-blind—so that the arm E of the elbow-lever will get a long leverage. It will readily be seen that when the blind is closed the slats L may be adjusted without raising the window by turning the crank-knob A, which, through the crank C, operates the elbow-lever D E, and the slat-bar P being located outside of the center of the slats to give the arm E a long leverage, only a small movement of the crank-knob A is necessary to operate said arm to its full limit.

I am aware that it is not new to operate blind-slats from the inside without opening the window, and hence I do not claim such, broadly, as being my invention. My device is simple in construction and easily operated, and when the blind is opened the slotted arm D of the elbow-lever and the crank C are disconnected from each other, the end of the crank being for that purpose loosely inserted in said arm. In closing the blind, this arm D should be guided so as to pass over the end of the crank C.

Having thus fully described my invention, what I claim as new, and desire to secure by Letters Patent, is—

The combination with a blind-frame, J, pivoted slats L L, and slat-bar P, attached to the slats outside of the center and provided with the eye-screw *d*, of the elbow-lever, having long arm E, and slotted arm D, and the shaft B having crank-knob A and crank C, all substantially as and for the purposes herein set forth.

JOHN G. WHITE.

Witnesses:
D. F. WEBBER,
F. E. LEITER.